(12) United States Patent  
Kaplan et al.

(10) Patent No.: US 9,015,847 B1  
(45) Date of Patent: Apr. 21, 2015

(54) COMPUTER SYSTEM FOR DISTRIBUTED DISCOVERY OF VULNERABILITIES IN APPLICATIONS

(71) Applicant: Synack, Inc., Menlo Park, CA (US)

(72) Inventors: Jay Kaplan, Palo Alto, CA (US); Mark Kuhr, Palo Alto, CA (US)

(73) Assignee: Synack, Inc., Menlo Park, CA (US)

( * ) Notice: Subject to any disclaimer, the term of this patent is extended or adjusted under 35 U.S.C. 154(b) by 0 days.

(21) Appl. No.: 14/271,110

(22) Filed: May 6, 2014

(51) Int. Cl.  
*H04L 29/06* (2006.01)  
*G06Q 30/02* (2012.01)

(52) U.S. Cl.  
CPC ........ *H04L 63/1433* (2013.01); *G06Q 30/0208* (2013.01)

(58) Field of Classification Search  
CPC .................. H04L 63/1433; G06Q 30/0208  
USPC ........................................................ 726/25  
See application file for complete search history.

(56) References Cited

U.S. PATENT DOCUMENTS

| | | | |
|---|---|---|---|
| 2003/0009696 A1* | 1/2003 | Bunker V. et al. | 713/201 |
| 2008/0209567 A1* | 8/2008 | Lockhart et al. | 726/25 |
| 2008/0263671 A1* | 10/2008 | Solino Testa et al. | 726/25 |
| 2011/0138470 A1* | 6/2011 | Davis et al. | 726/25 |
| 2014/0201842 A1* | 7/2014 | Tripp et al. | 726/25 |
| 2014/0283081 A1* | 9/2014 | Sheridan | 726/25 |

OTHER PUBLICATIONS

Google, Google's Vulnerability Reward Program, Nov. 2010, retrieved from https://www.google.com/about/appsecurity/reward-program/.*

* cited by examiner

*Primary Examiner* — Chau Le  
(74) *Attorney, Agent, or Firm* — Hickman Palermo Truong Becker Bingham Wong LLP

(57) ABSTRACT

In one aspect, the disclosure provides: A method comprising: inviting a distributed plurality of researchers to participate in one or more computer vulnerability research projects directed to identifying computer vulnerabilities of one or more networks and/or computers that are owned or operated by a third party; assessing reputation and skills of one or more of the researchers, and accepting a subset of the researchers who have a positive reputation and sufficient skills to perform the investigations of the computer vulnerabilities; assigning a particular computer vulnerability research project, relating to a particular network under test, to a particular researcher from among the subset of the researchers; using a computer that is logically interposed between the particular researcher and the particular network under test, monitoring communications between the particular researcher and the particular network under test, wherein the communications relate to attempting to identify a candidate security vulnerability of the particular network under test; validating a report of the candidate security vulnerability of the particular network under test that is received from the particular researcher; determining and providing an award to the particular researcher in response to successfully validating the report of the candidate security vulnerability of the particular network under test that is received from the particular researcher.

22 Claims, 5 Drawing Sheets

COMPUTER SYSTEM FOR DISTRIBUTED DISCOVERY OF VULNERABILITIES IN APPLICATIONS

FIELD OF THE DISCLOSURE

The present disclosure generally relates to testing of computers relating to security issues. The disclosure relates more particularly to techniques for performing network penetration testing, attack testing, identification of security vulnerabilities, and related security testing of web applications, server computers, and network elements.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Present approaches for identifying security problems in networks have significant drawbacks. Typical network security evaluation, testing and protection involves installing protective elements in the network such as firewalls, virus and malware scanners, and similar systems. These systems receive reports of attack vectors that are occurring in other networks and attempt to determine if the same attacks are occurring in a particular network under test. If so, reports may be prepared and network administrators may manually examine the configuration of internetworking elements, web applications and server computers to determine whether configuration should be changed to remove a problem or prevent an attack.

However, a drawback of these approaches is that they are responsive, rather than preventive. Typically there are so many different kinds of attacks that it is considered impractical for a network administrator, or even a team of security professionals within a large enterprise, to exhaustively test all network elements and computing devices of the enterprise for vulnerability to all known attacks, malware and viruses. Therefore, in current practice many enterprise web applications, server computers and similar gear have a period of continued vulnerability until an actual security event is identified and addressed.

SUMMARY

The appended claims may serve as a summary of the invention.

DETAILED DESCRIPTION

Figure 1:
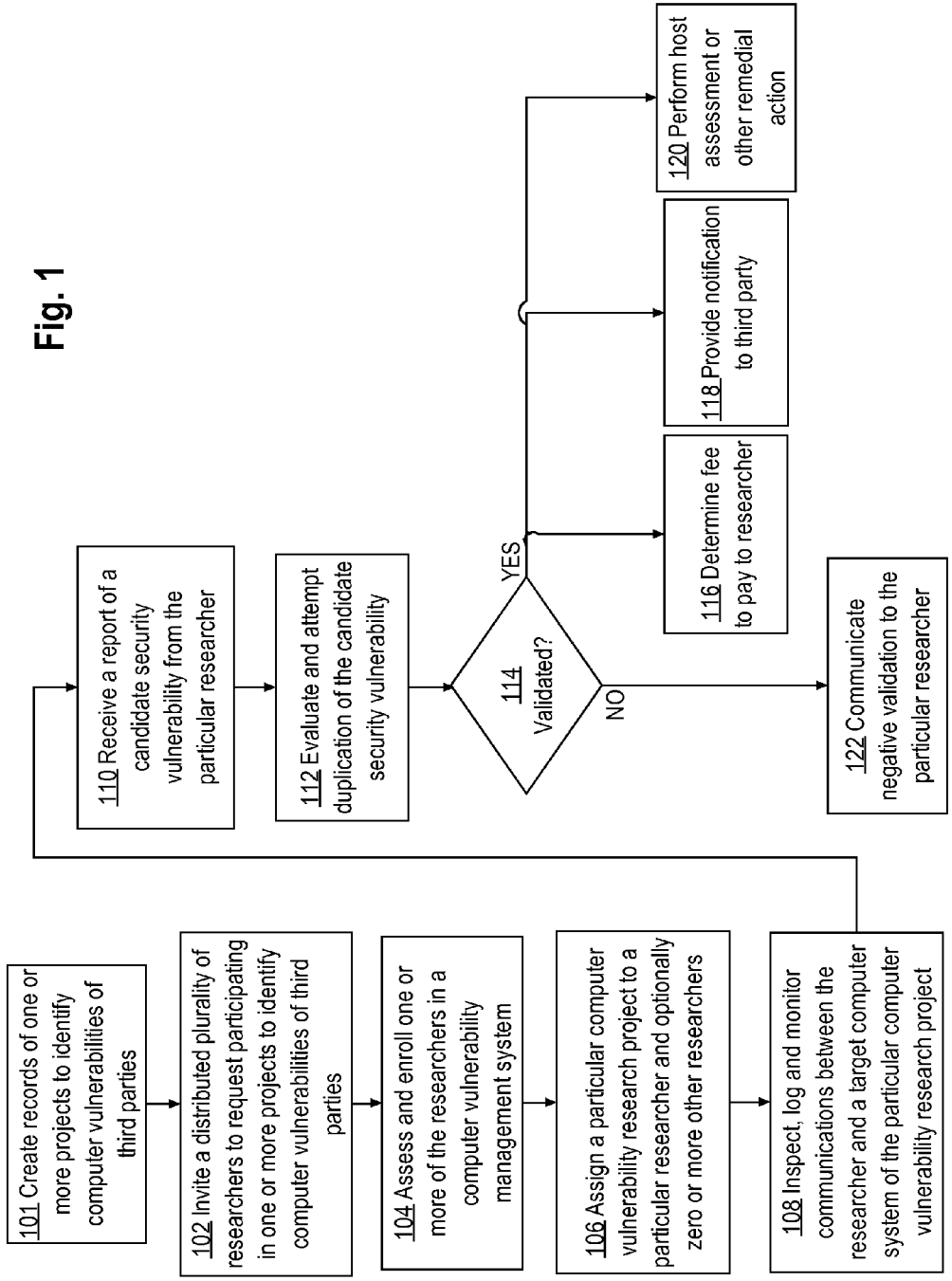
FIG. 1 illustrates a process of crowd-sourced application vulnerability discovery.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described according to the following outline:
1. General Overview
2. Crowd-Sourced Application Vulnerability Discovery
3. System for Globally Distributed Crowd-Sourced Network Penetration Testing
4. Security Assessment Incentive Program For Promoting the Discovery of Computer Software Vulnerabilities
5. Implementation Example—Hardware Overview
6. Extensions and Alternatives

1. General Overview

In one aspect, the disclosure provides: A method comprising: inviting a distributed plurality of researchers to participate in one or more computer vulnerability research projects directed to identifying computer vulnerabilities of one or more networks and/or computers that are owned or operated by a third party; assessing reputation and skills of one or more of the researchers, and accepting a subset of the researchers who have a positive reputation and sufficient skills to perform the investigations of the computer vulnerabilities; assigning a particular computer vulnerability research project, relating to a particular network under test, to a particular researcher from among the subset of the researchers; using a computer that is logically interposed between the particular researcher and the particular network under test, monitoring communications between the particular researcher and the particular network under test, wherein the communications relate to attempting to identify a candidate security vulnerability of the particular network under test; validating a report of the candidate security vulnerability of the particular network under test that is received from the particular researcher; determining and providing an award to the particular researcher in response to successfully validating the report of the candidate security vulnerability of the particular network under test that is received from the particular researcher.

In another aspect, the disclosure provides: A data processing method comprising: using a computer, inviting a distributed plurality of researcher computers to participate in one or more computer vulnerability research projects directed to identifying computer vulnerabilities of one or more networks and/or computers that are owned or operated by a third party; using the computer, assigning a particular computer vulnerability research project, relating to a particular network under test, to a particular researcher computer from among a subset of the researcher computers; using control logic that is logically interposed between the particular researcher computer and the particular network under test, monitoring networked data communications between the particular researcher computer and the particular network under test, wherein the communications relate to attempting to identify a candidate security vulnerability of the particular network under test; validating a report of the candidate security vulnerability of the particular network under test that is received from the particular researcher computer; performing one or more remediation operations on the particular network under test based at least in part upon the report; wherein the method is performed using one or more computing devices.

In yet another aspect, the disclosure provides: A method comprising: inviting a distributed plurality of researchers to participate in one or more computer vulnerability research projects directed to identifying computer vulnerabilities of one or more networks and/or computers that are owned or operated by a third party; publishing, to the distributed plurality of researchers, a taxonomy of potential computer vulnerabilities, wherein each particular computer vulnerability in the taxonomy is associated with a range of award values; using a computer that is communicatively coupled to a particular researcher among the distributed plurality of researchers and a network under test among the one or more networks and/or computers, monitoring communications between the particular researcher and the particular network under test, wherein the communications relate to attempting to identify a candidate security vulnerability of the particular network under test; in response to a report of the candidate security vulnerability of the particular network under test that is received from the particular researcher, and based upon the taxonomy, determining and providing a particular award value to the particular researcher.

These approaches offer significant benefits over prior practice. In one embodiment, top global security talent previously inaccessible to enterprises can be recruited and incentivized through bounties to discover security vulnerabilities in a variety of target applications and systems. Security resources on a global scale can be safely engaged, and dynamic economics and gamification may be used to incentivize those performing work. Consequently, fees and rewards generate results, rather than generic reports.

In some embodiments, the system described herein can launch a full vulnerability assessment, leading to rapid results, in just a few hours. With little lead time, organizations can obtain rapid feedback, decreasing time to market and enabling patching vulnerabilities before it is too late. The approaches also can be scalable. By using global resources, the approaches can scale to a multitude of assessments at once. For enterprises with large applications or numerous web endpoints, the approaches herein provide a solution to obtain rapid results that are far more effective than traditional automated or manual solutions.

Embodiments also are configured to be adaptable. Assessments can be supported by industry experts who are well-versed in all technology stacks as they evolve. Testing, in embodiments, does not rely upon signatures but uses adversarial tactics to discover the latest zero-day vulnerabilities with methods that provide unique insight into attack vectors. Researchers undergo a strict verification and vetting process, and users of the services described herein can select from among varying levels of trust and verification of the security researchers who conduct the work.

2. Crowd-Sourced Application Vulnerability Discovery

FIG. 1 illustrates a process of crowd-sourced application vulnerability discovery. In an embodiment, a party implementing the process of FIG. 1 may efficiently coordinate with a large number of globally distributed researchers to identify a variety of different computer vulnerabilities of target computers or hosts of a third party computer network. For example, the process of FIG. 1 may be implemented by a service provider that has a contract relationship with a plurality of globally distributed computer security researchers on the one hand, and that has a vendor-customer relationship to the third party owner or operator of a computer system that serves as the target of vulnerability investigation. Using such a three-party approach, including a large number of distributed researchers seeking to identify vulnerabilities in a controlled and monitored manner, computer vulnerabilities can be identified and investigated far faster and more efficiently than in prior approaches.

In one embodiment, at block 101, the process of FIG. 1 includes creating records of one or more projects to identify computer vulnerabilities of third parties. Block 101 broadly represents, for example, a service provider who implements FIG. 1 entering into a contract or other relationship with a third party that owns or operates a computer system or network, and creating records of computers, systems, applications, or other elements that the third party wishes to have evaluated for computer vulnerabilities. The third party and the service provider thus may have a customer-vendor relationship. "Computer vulnerabilities," in this context, includes any of security vulnerabilities, network vulnerabilities, opportunities or data breaches and the like for any of end station computers, server computers, cloud computing instances or resources, internetworking infrastructure such as routers, switches, firewalls and gateways, or other hardware devices, as well as logical or software entities such as database servers, application servers, or online applications such as web applications, mobile applications, etc. The service provider may work closely with organizations to create a project that best fits their budgetary constraints and technical requirements, including in some embodiments performing an initial assessment of the organization's security posture to ensure that the organization is well positioned for the commencement of crowd-sourced vulnerability testing.

Further, block 101 comprises creating records of specific projects to identify vulnerabilities. Project records may be defined by the service provider and the third party, for example, by preparing a topology or other description of specific assets in a network or among a set of computers that the third party desires to check or test.

In one embodiment, at block 102, the process of FIG. 1 includes inviting a distributed plurality of researchers to request participating in one or more projects to identify computer vulnerabilities of third parties. For example, a service provider may use online forums, message boards, e-mail lists, or its own website to promote the opportunity to participate in a crowd-sourced research project directed at computer vulnerabilities. Typically the identities of the third parties are known in advance, as the service provider will have entered into a contract with one or more third parties to provide consulting services, security investigation, or other services to the third party relating to the security posture of its network. However, typically the third parties are not identified at block 102 for purposes of confidentiality. Non-disclosure agreements and other rules of engagement may be implemented as part of bringing researchers onboard; for example, social engineering, DDos, and spam-based attacks may be prohibited, and organizations may define other rules of engagement for a specific area or technology.

In this context, "distributed plurality of researchers" refers to any number of researchers located anywhere in the world. Global or wide area distribution is not required, however. Typically the researchers are not employees of the party implementing the method; the researchers may be previously unknown to the party at the time of the invitation of block 102, or may be known informally through security forums, conferences or other methods.

At block 104, the process comprises assessing and enrolling one or more of the researchers in a computer vulnerability management system. Block 104 may include inspecting credentials of researchers who reply to the invitation of block 102, determine reputation of the researchers, and creating data records in a computer database that identify the researchers and provide contact information, sources of reputation information, resumes or curricula vitae and like information. Assessment at block 104 also may comprise providing responsive researchers with one or more online tests or assessments to determine the level of skill or expertise of the researchers. For example, the party implementing FIG. 1 may maintain a networked computer system that has known vulnerabilities, and may provide responsive researchers with a network address and/or complete or partial login credentials for the system; the researchers then may be directed to attempt to find one or more security vulnerabilities in that system as a means of testing skill and knowledge. Block 104 also may involve updating the database with the results of the assessment.

At block 106, the process comprises assigning a particular computer vulnerability research project to a particular researcher and optionally zero or more other researchers. For example, block 106 may comprise providing a summary of a record of a particular computer vulnerability research project among those that were defined at block 101, and an access location that is associated with the service provider. In an embodiment, block 106 may involve providing a network address or domain address of a target computer to the researcher, and/or partial or complete access credentials for a computer or resource that is associated with the particular computer vulnerability research project. Additionally or alternatively, the particular researcher and any other researchers, are given access credentials or location data for a computer or application that is associated with the service provider, and the researchers then access the target computer or network of the particular vulnerability research project only through the service provider's computer and/or application. In one embodiment, the means of access for researchers is termed a Launch Point; an example detailed description of a Launch Point is provided in other sections herein.

This information may be provided or offered to a particular researcher, or to a group of researchers. The number of researchers involved in a particular project is not limited and there may be benefits involved in assigning a single project to multiple unrelated or distributed researchers to encourage competition to find vulnerabilities. The particular steps or information involved in block 106 are not critical provided that one or more researchers obtain sufficient information to understand the nature and goals of a project, or the identity of a network location or computer that is to be investigated.

At block 108, the process comprises inspecting, logging and monitoring communications between the researcher and a target computer system of the particular vulnerability research project. In general, the process is configured to permit the party implementing FIG. 1 to inspect, log, and/or monitor all electronic communications between the researchers who are assigned to a project and the target computers, networks or systems of the third party. This approach may permit the party implementing FIG. 1 to determine useful assessment data such as: the number of communications between the researcher and the target systems; whether the researcher appears to be actually addressing the subject matter of the particular vulnerability research project; whether the researcher is attempting to access resources of the third party for which access is prohibited or out of scope for the particular vulnerability research project; whether the researcher appears competent and/or diligent; and other metrics.

As an example, block 108 may include storing an audit trail of all URLs that the researcher sends to the target systems; keystroke logging other input of the researcher to the target systems; storing URLs of dynamically generated pages that the target systems may generate in response to action by a researcher; storing individual flow records and/or aggregated flow data based upon packet flow identifiers such as the TCP/IP 5-tuple; storing sets of packets, segments, messages or request-response pairs based upon 5-tuple or other identifying data; and any other data associated with communications between the researchers and the target systems.

At block 110, the process receives a report of a candidate security vulnerability from a particular researcher. In one embodiment, a researcher who thinks s/he has identified a security vulnerability in a target system may submit a report that specifies the vulnerability and identifies the target system. Various formats may be used for submitting reports of apparent security vulnerabilities and the particular form of the report is not critical. An example is provided in another section herein.

At block 112, the process comprises evaluating and attempting to duplicate the candidate security vulnerability that the researcher reported. For example, block 112 may involve re-performing a sequence of operations that are identified in the report, and/or re-performing a sequence of operations that were obtained via block 108. At block 114, the process tests whether the candidate security vulnerability was successfully validated. If not, then at block 122 a negative report or message may be communicated to the researcher, indicating that the vulnerability could not be validated, that further information is needed, or that the report appears to represent something other than a security vulnerability. The particular form and content of such a report or message is not critical.

If the test of block 114 is true, then several operations may be performed, sequentially in any order, or in parallel. At block 116, in one embodiment, the process determines a fee to pay to the researcher. The fee at block 116 may be deemed an incentive award, bounty, service fee or any other form of payment. The fee may comprise value in a recognized hard currency, in an electronic currency such as Bitcoin, and/or in a virtual currency such as tokens, points, or other items that are redeemable in another program, system or facility. Specific techniques for determining the fee of block 116 are described in another section herein.

At block 118, a notification may be provided to the third party. For example, a validated security vulnerability may be described in a report, message or other communication to the third party that owns or operates the network, computer or system that was the subject of the particular computer vulnerability research project. The particular form and content of such a report or message is not critical.

At block 120, the process comprises performing host assessment or other remedial action. For example, block 120 may comprise performing one or more security remediation operations on a host that the researcher identified in the report of block 110, such as installing software updates, changing configuration data, reconfiguring a position of a unit in a network topology, updating the configuration of automatic attack detection systems such as intrusion detection systems, and other operations.

As a result, the approach of FIG. 1 may lead to more rapid identification and remediation of vulnerability issues in computers or networks by providing a way to induce a potentially large number of distributed researchers to attempt attacks, intrusions, or other exploitation of vulnerabilities of the computer or networks, optionally in return for a fee, award or other recognition. A party implementing FIG. 1, such as a service provider, serves as an intermediary between the distributed researchers and the target computers or networks, so that all communications of the researchers—which may include actual attack attempts—can be inspected, monitored and logged. Further, the third party that owns or operates the network that is the subject of an investigation can receive reports, remediation operations, and/or configuration data based upon the work of the distributed researchers after validation by the service provider. All these features and aspects may provide a greatly improved, more efficient and more effective process for identifying and addressing computer vulnerabilities.

Figure 2:
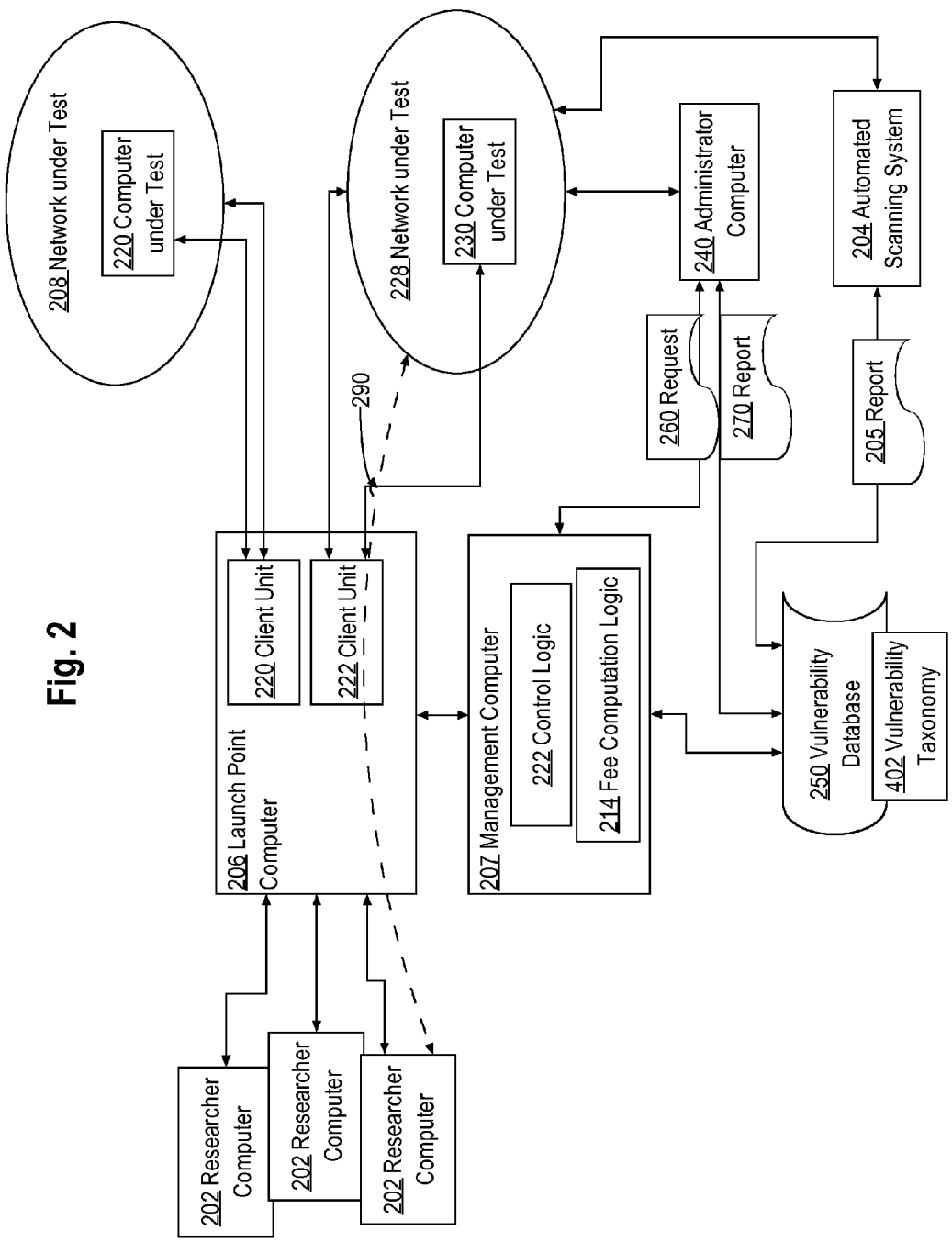
FIG. 2 illustrates an example computer system arrangement that may be used for crowd-sourced web application vulnerability discovery, providing globally distributed network penetration testing, and determining incentives for promoting the discovery of vulnerabilities.
Figure 3:
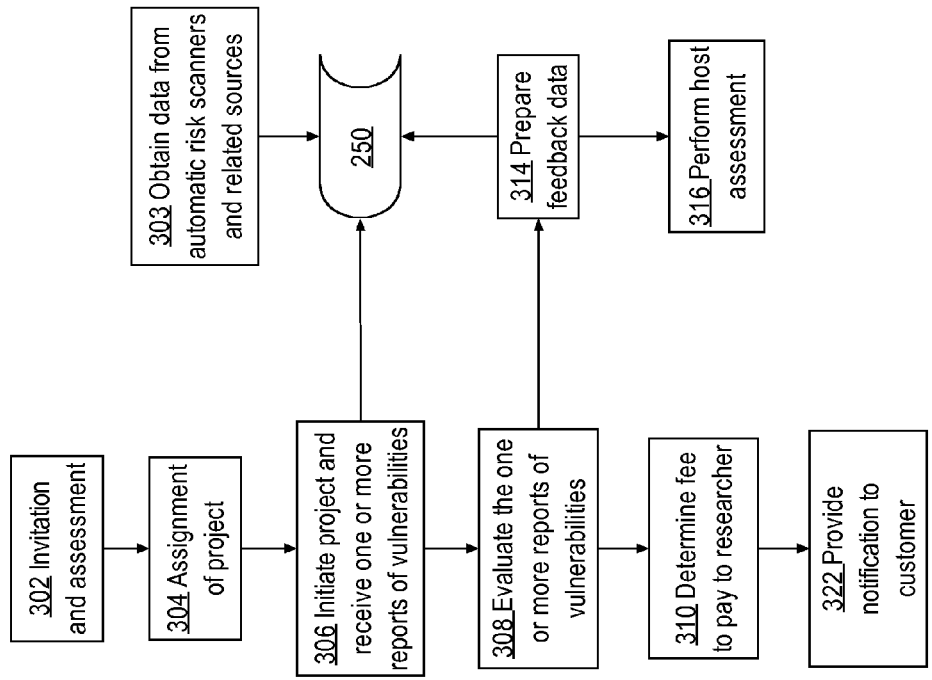
FIG. 3 illustrates a process of application vulnerability discovery integrated with certain computer system elements of FIG. 2.

3. System for Globally Distributed Crowd-Sourced Network Penetration Testing FIG. 2 illustrates an example computer system arrangement that may be used for crowd-sourced web application vulnerability discovery, providing globally distributed network penetration testing, and determining incentives for promoting the discovery of vulnerabilities. FIG. 3 illustrates a process of application vulnerability discovery integrated with certain computer system elements of FIG. 2. Referring first to FIG. 2, in one embodiment, a plurality of researcher computers 202 are coupled via one or more networks and/or internetworks to a Launch Point computer 206. An automated scanning system 204, management computer 207, vulnerability database 250, and one or more networks under test 208, 228 also are communicatively coupled to the Launch Point computer 206. For purposes of illustrating a clear example, FIG. 2 shows a limited number of researcher computers 202, automated scanning system 204, network under test 208, 228, computer under test 226, 230, and client units 220, 222, but in practical embodiments the number of such units is not limited; embodiments may interoperate with at least thousands of distributed researchers with computers and with any number of customer networks under test having any number of computers or other nodes under test.

In an embodiment, each of the researcher computers 202 is associated with one of a plurality of distributed researchers of the type previously described. The researcher computers 202 may comprise any of desktop computers, workstations, laptop computers, netbook computers, ultrabook computers, tablet computers or smartphones. The researcher computers 202 are coupled indirectly to the Launch Point computer 206 by any combination of one or more local area networks, wide area networks, internetworks and the like, which may include the public internet.

Launch Point computer 206 comprises, in one embodiment, one or more client units 220, 222, and may be coupled to a management computer 207 comprising control logic 224 and fee computation logic 214 and coupled to a vulnerability database 250. In an embodiment, the Launch Point computer 206 acts as a terminal that is configured for the purposes of providing network connectivity and monitoring for communications between researcher computers 202 and the networks under test. Moreover, the logical position of Launch Point computer 206 between the researcher and the network under test provides secure routing of researcher communications to networks under test and provides a predictable source IP address for the owner/operator of the network under test, to enable adjustment of firewalls and/or IPS/IDS devices.

In an embodiment, each of the client units 220, 222 is configured to communicate to a different computer under test 226, 230 located respectively in a different network under test 208, 228. Each client unit 220, 222 thus is configured to cooperate with Launch Point computer 206 in acting as an intermediary between one or more of the researcher computers 202 and one of the networks under test 208, 228 and/or one of the computers under test 226, 230. As indicated by arrow 290, each of the researcher computers 202 may establish a logical bidirectional communication path to one or more of the networks under test 208, 228, with all communications passing through Launch Point computer 206 for purposes of controlling which particular researcher computers are connected to which particular network under test and for monitoring, logging and/or analysis. As further described herein, control logic 222 may be configured to provide a particular researcher computer 202 with access to a particular network under test 208, 228 only under specified circumstances including after assessment, testing, assignment of a project, or other operations. Thus, researcher computers 202 typically cannot contact the networks under test 208, 228 at will; instead, the Launch Point computer 206 must facilitate access, grant access or provide credentials.

Control logic 224 is configured, in an embodiment, to implement the control functions and management functions that are described further herein. Fee computation logic 214 is configured, in an embodiment, to determine a fee, award, bounty or other payment, value or currency that is due or payable to one of the researchers in consideration for identifying a vulnerability of one of the computers under test 226, 230 or networks under test 208, 228. Techniques for computing applicable fees are described herein in other sections. Each of the control logic 224 and fee computation logic 214 may be implemented using one or more computer programs, other software elements, other digital logic as described for FIG. 5, or any combination thereof.

An automatic scanning system 204 may be coupled to one or more of the networks under test 208, 228 and/or to one or more of the computers under test 226, 230 and may generate one or more reports 205 based upon performing automatic scanning operations on those networks or computers. The reports 205 may be received at vulnerability database 250 to provide baseline vulnerability data or to assist in defining the computer vulnerability projects that may be offered to researchers. Additionally, in an embodiment, control logic 224 may implement a feedback loop in relation to automatic scanning system 204 by which the control logic provides updates to configuration data or other input to the automatic scanning system, based upon validated vulnerability reports from researchers, to improve the ability of the automatic scanning system to detect other vulnerabilities in the future in relation to the networks under test 208, 228 or the computers under test 226, 230.

A vulnerability database 250 may be coupled to Launch Point computer 206 and may be configured to store metadata or substantive data about researchers, researcher computers 202, client units 220, 222, networks under test 208, 228, computers under test 226, 230, and other data useful to support operation of the system. In an embodiment, management computer 207 or another computer may host a web application that enables clients and researchers to collaborate regarding fixing vulnerabilities that have been input to the vulnerability database 250.

A particular network under test 228 may be coupled to an administrator computer 240 that is associated with a network administrator for that network. In an embodiment, control logic 224 is configured to receive one or more requests 260 from the administrator computer 240 via a client web interface hosted at management computer. The requests typically relate to performing vulnerability tests on the associated network under test 228, or the computer under test 230 within that network or other nodes of that network. Control logic 224 also may be configured to generate and send one or more reports 270 to the administrator computer 240 relating to security vulnerabilities that have been identified in the associated network under test 228, or the computer under test 230 within that network or other nodes of that network.

Thus, it may be seen from FIG. 2 that embodiments may provide a Launch Point computer 206 associated with a first party, logically arranged as an intermediary between the researcher computers 202 associated with second parties and the networks under test 208, 228 and computers under test 226, 230 of third parties. Input from the Launch Point computer 206 may be used to update an automatic scanning system 204 to improve its performance, and administrators associated with administrator computer 240 may receive reports about vulnerabilities that are found.

Referring now to FIG. 3, in an embodiment, a process of crowd-sourced application vulnerability discovery may be integrated with selected technical elements of FIG. 2 to efficiently coordinate with a large number of globally distributed researchers to identify a variety of different computer vulnerabilities of target computers or hosts of a third party computer network.

At block 302, invitation and assessment is performed. In an embodiment, a party implementing FIG. 3 takes steps to identify and invite researchers, and in some embodiments block 302 may represent performing blocks 101, 102, 104 of FIG. 1 as described above. Assessment may include investigation of social media postings of candidate researchers and other online sources of data to determine, for example, that a particular researcher is a so-called white hat hacker and not a malicious computer user. Assessment may include an interview process, which may comprise in part a live interview of the candidate researcher, background checks of the candidate researcher, skill tests, identity verification, and other investigation. Assessment further may comprise performing a randomized technical exam of a candidate researcher in which the researcher is required to classify issues relating to web application security, mobile application security, infrastructure, and other issues. A practical assessment of skills in this manner may serve as a precondition for receiving an invitation to join a team of researchers. Results may be used to segment researchers into various trust categories based upon user requirements; the level of trust can be used to affect the amount of a bounty that is later calculated.

In an embodiment, block 302 also may involve storing data that segments or classifies the researcher based upon citizenship, levels of permissible government access, residence or domicile, or other factors; the database 250 may be updated with tags in records that identify researchers for these attributes.

At block 304, assignment of a project occurs. In an embodiment, block 304 presumes that the service provider operating Launch Point computer 206 and the third party of network under test 208, 228 have defined one or more computer vulnerability projects. Defining projects may comprise, for example, by preparing a topology or other description of specific assets in the network under test 208, 228 that the third party desires to check or test and creating records of projects in database 250. Additionally or alternatively, the automated scanning system 204 may provide reports 205 that may suggest vulnerabilities or indicate anomalies that indicate that vulnerabilities exist; data in the reports may be used to form records of projects for investigation.

Block 304 may include the operations of block 106 described above. Further, assignment of a project may comprise granting access to a researcher to a web portal for web applications that are within the scope of the project. The web portal may provide, for example, a screen view that displays the identity and general content of computers, networks or other resources that are within the scope of a particular vulnerability research project. Typically, the identity of customers of the party that implements FIG. 3 are anonymized so that researchers are not aware of exactly whom they are attacking, to prevent the introduction of bias into the vulnerability detection process. In one embodiment, assignment of a project may include receiving a sign-up request for a specific project or target. Obtaining agreement of the researcher to a customer-specific confidentiality agreement may be required as part of the assignment process.

At block 306, the project is initiated by the researcher and the party implementing FIG. 3 receives one or more reports of computer vulnerabilities within the scope of the assigned project. Block 306 may represent the operation of blocks 106, 108, 110 of FIG. 1 as described above. Further, in one embodiment, initiating a project comprises instantiating a virtual machine in a shared data center, such as a cloud computing facility, that implements the Launch Point computer 206 as a server instance or other computing instance. Thus, the Launch Point computer 206 may be spun up on demand. Any such server may be instantiated at a geographical location that is based upon a location of the particular researcher who is involved in a project; thus, for example, if the service provider who implements FIG. 3 is located in Los Angeles, the network under test 208 is located in New York, and the researcher computer 202 of a researcher assigned to that network is located in Miami, then the Launch Point computer 206 might be spun-up preferably at a data center in Atlanta or Miami rather than a data center in New York or Los Angeles.

Block 306 further comprises monitoring and optionally logging all tests, messages and between an assigned researcher computer 202 and a target network or computer; thus, all tests funnel through the infrastructure of the service provider to permit logging activity and capturing actions taken by a researcher.

Reports of vulnerabilities may be received periodically from any of the researchers who are assigned to a project. In an embodiment, data comprising a vulnerability report is received in the same view or user interface facility that is used to obtain data about projects, target computers and target networks. In an embodiment, to report a prospective vulnerability, the researcher enters a category value and optionally a sub category value for the vulnerability that they are reporting. The category and sub category values are deemed proposed and are subject to validation by the service provider. In some embodiments, reporting a prospective vulnerability may comprise receiving data values in fields of a submission form. As an example, a submission form may comprise data fields for: Title; Description; Vulnerability Category, which may be selected from a drop-down menu or other GUI widget; Steps to Reproduce the vulnerability; Impact of the vulnerability; Secret gist for one or more codes that were used to determine the vulnerability; Recommended Fix; and URL identifier for a URL at which the vulnerability exists.

In some embodiments, reporting a proposed vulnerability also comprises receiving answers to a questionnaire Examples of questions include:

1. Is an authenticated login required? Yes, No
2. What is the impact to confidentiality? None, Yes for a single user, Yes for more than one user.
3. Is the integrity of application or user data compromised? No, Yes for a single user, Yes for more than one user.
4. Could this vulnerability have any impact on application availability? No, Yes for a single user, Yes for more than one user.

At block 308, the reported vulnerability is evaluated and validated, which may include the operation of blocks 112, 114 of FIG. 1. In an embodiment, evaluation of a vulnerability may comprise deduplication, which involves checking whether another researcher has previously reported the identical vulnerability or a substantially similar vulnerability. Deduplication may comprise performing a literal or fuzzy comparison of the values received in response to the questionnaire, and other data received from the researcher about the suggested vulnerability, to records of previously reported vulnerabilities in database 250. Evaluation of a vulnerability also may comprise verifying the quality of a submission and requesting more information if needed. Evaluation of a vulnerability also may comprise validating the report by re-performing the exact attack that was reported to check that what the researcher reported is a genuine vulnerability.

At block 310, the process determines a fee to be paid to the researcher who reported the proposed vulnerability as noted above for block 116. In one approach, block 310 is configured, based on the answers that were received to the questionnaire described above, to calculate a vulnerability score such as a CVSS score, and to map the category and subcategory of vulnerability and the CVSS score to a minimum price and a maximum price. The CVSS score may be scaled linearly to a price between the minimum and maximum price, using a stored mapping to a price for a bounty to be paid. Typically a score value of 0 maps to the minimum price and a score value of 10.0 maps to the maximum price, after summing all the CVSS components. In this manner, embodiments can provide a real-time, market value calculation for the value of a reported vulnerability.

Figure 4B:
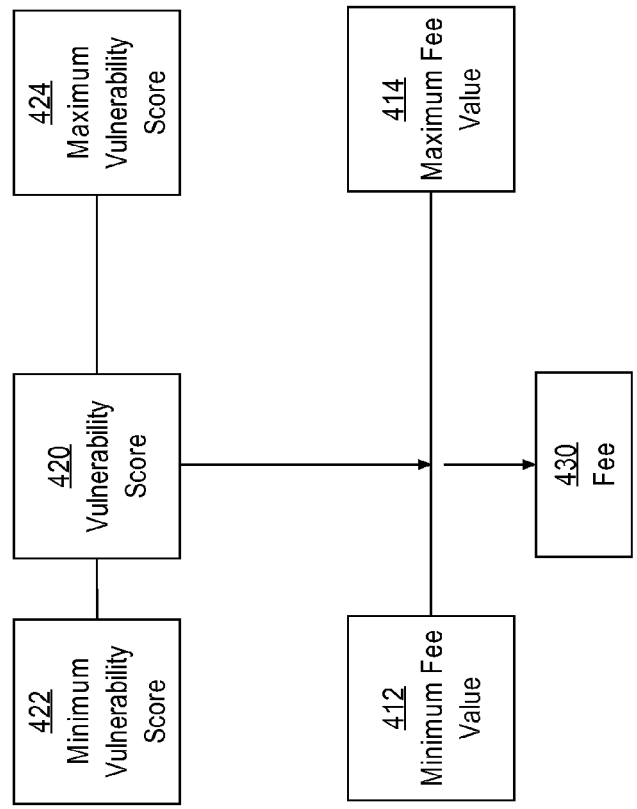
FIG. 4B illustrates determining an incentive award to a researcher for discovering a vulnerability.
Figure 4A:
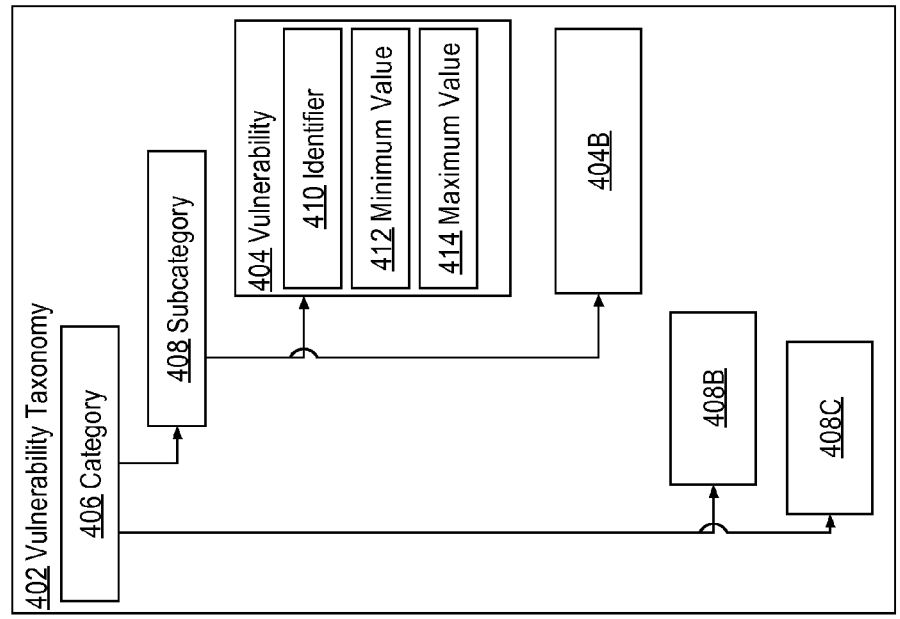
FIG. 4A illustrates a mapping of vulnerability categories, in a taxonomy, to ranges of incentive award amounts.

For purposes of determining fees, deduplication and other purposes, the control logic may be configured to manage a vulnerability taxonomy in the database 150 that associates categories, subcategories, vulnerability names, and a range of fees. FIG. 4A illustrates an example vulnerability taxonomy, and FIG. 4B illustrates an example mapping of a particular vulnerability score to a particular fee. Referring first to FIG. 4A, in one embodiment, a vulnerability taxonomy 402 comprises a plurality of any number of categories 406, 406B, 406C. A category 406 may have any number, including zero, of subcategories 408, 408B, 408C. A category 406 or a subcategory 408 may be associated with one or more vulnerabilities 404, of which one is shown in FIG. 4A for purposes of illustrating a clear example.

In an embodiment, a particular vulnerability 404 comprises an identifier 410, a minimum value 412 and a maximum value 414. The identifier 410 may be any label that enables human and/or machine recognition of a particular vulnerability. Identifier 410 may comprise a value that is usable in programmatic operations, or a displayable name, or both. The minimum value 412 represents a minimum amount of a fee that is payable to a researcher for identifying the associated vulnerability in a target system; the maximum value 414 represents a maximum of such a fee. The minimum value 412 and the maximum value 414 may be represented using any form of units. In one embodiment, integers representing US dollars are used.

Referring now to FIG. 4B, in an embodiment, the minimum value 412 and maximum value 414 may be used as endpoints of a fee range. The vulnerability score 420 for a particular vulnerability, which may be determined using CVSS or other scoring, also lies within a separate range having a minimum score value 422 and a maximum score value 424. In an embodiment, the particular vulnerability score 420 is linearly mapped from its position in the range of score values to an equivalent position in the range of fees, resulting in selection or computation of a particular fee 430 for the associated vulnerability having the particular vulnerability score 420.

Computation of a CVSS score may be performed according to NIST standards, using the following expressions:

$$BaseScore = (0.6*Impact + 0.4*Exploitability - 1.5)*f(Impact)$$

$$Impact = 10.41*(1-(1-ConfImpact)*(1-IntegImpact)*(1-AvailImpact))$$

$$Exploitability = 20*AccessComplexity*Authentication*AccessVector$$

where the following variables have the following values:
access_complexity: 0.61
access vector: 1.0
authentication:
question: "Is an authenticated login required?"; answers: "Yes.": 0.56; "No.": 0.704
confidentiality_impact:
question: "What is the impact to confidentiality?"; answers: "None.": 0.0; "Yes, for a single user.": 0.275; "Yes, for more than one user.": 0.660 integrity_impact:
question: "Is the integrity of application or user data compromised?"; answers: "No.": 0.0; "Yes, for a single user.": 0.275; "Yes, for more than one user.": 0.660 availability_impact:
question: "Could this vulnerability have any impact on application availability?"; answers: "No.": 0.0; "Yes, for a single user.": 0.275; "Yes, for more than one user.": 0.660

The following is an example description of a vulnerability that is nested one level down in a taxonomy of vulnerabilities and is associated with particular specified prices:
sql_injection:
display: "SQL Injection"
poorly_filtered_strings:
display: "Poorly Filtered Strings"
min: 1500.0
max: 2000.0

The resulting price may be provided to the researcher and existing payment networks or other transfer systems may be used to convey a fee equal to the price, or other items or virtual currency, to the researcher. In an embodiment, pricing is standardized regardless of customer; this sets expectations among the researcher community so they always know if they find a particular hard vulnerability that they will get a specified amount.

Referring again to FIG. 3, in an embodiment, at block 322, the process provides a notification to the customer as generally described above for block 118 of FIG. 1. In an embodiment, the Launch Point computer 206 may host an application program, web server or the equivalent that provides a separate portal into which a customer of the service provider may log into. In an embodiment, the customer portal provided by management computer 207 may enable customers to obtain and display, via administrator computer 240 for example, a view of vulnerabilities that have been identified by the researcher computers 202, organized according to particular assets within a network under test 208. Assets, in this context, may comprise computers, elements of networking infrastructure, applications, or other nodes or items. The customer portal may enable, in one embodiment, the customer to change the status of a particular vulnerability to identify remediation steps that the customer has undertaken for an associated asset or for the vulnerability as a whole. In an embodiment, the control logic 224 may be configured to export data representing vulnerability reports and/or remediation efforts to a bug tracking application, such as JIRA, commercially available from Atlassian Pty Ltd., Sydney, Australia.

In an embodiment, control logic 224 may be configured to facilitate direct communication between administrator computer 240 and a particular researcher computer 202 that is associated with a researcher who identified a particular vulnerability. In such an embodiment, Launch Point computer 206 may act as an intermediary for such communications and may log messages or serve as a message store-and-forward service with which the administrator computer 240 may compose a message and request dispatch to the particular researcher computer 202. In this manner, the administrator computer 240 of a particular customer of the Launch Point computer 206 may re-engage the researcher computer 202, for example, to request a re-validation to check if a particular vulnerability was successfully corrected or patched as a result of remediation operations that the customer performed. In some embodiments, the management computer 207 or another system may convey a fixed fee to the researcher computer 202 in consideration for such a re-evaluation.

In an embodiment, at block 314 of FIG. 3, the process prepares feedback data and provides the feedback data to the database 240 and/or to the automatic risk scanners 204. For example, control logic 224 may be configured to transform a specific vulnerability into a generic description of the vulnerability so that the same class or type of vulnerability can be found in other apps of the same type. The generic description may be formatted according to a general protocol or may be expressed in terms of operations, syntax, semantics, or configuration data that is compatible with a particular one or more of the automated risk scanners 204. In this manner, a particular vulnerability that is identified by any of the researcher computers 202 may be used to update the automated vulnerability scanners 204 so that finding new vulnerabilities becomes more difficult for the researcher computers over time.

At block 316, one or more host assessment operations may be performed, as generally noted above for block 120 of FIG. 1. In one embodiment, host assessment comprises generating one or more sets of fingerprint data that represent a hardware configuration and software configuration or posture of a particular asset in a network under test 208. In an embodiment, the fingerprint data may represent configuration of an asset at the patch level, and the fingerprint data may be provided to the automatic vulnerability scanners 204 to permit improved scanning of hardware, software and services. Any form of signature data may be used, pertaining for example to application semantics.

4. Security Assessment Incentive Program for Promoting the Discovery of Computer Software Vulnerabilities Embodiments may be used to implement incentive programs to induce or encourage the researcher computers 202 to locate vulnerabilities. In one embodiment, as described above for FIG. 1 and FIG. 3, a process of identifying computer vulnerabilities may integrate the offering, determination and payment of fees to researchers as an inducement to discovery vulnerabilities. The inducement benefit of such a method may be enhanced, in one embodiment, by publishing an approximate range of fees that will be paid and information about how a vulnerability score of a particular vulnerability is mapped within the range to yield a particular fee. In this manner, researchers in the field receive objectively understandable information about how a fee will be determined and paid, which should improve confidence in the overall method and system.

In another embodiment, the methods of FIG. 1, FIG. 3 may be supplemented with gamification operations. For example, in one embodiment, the methods of FIG. 1, FIG. 3 also include, and/or the control logic 224 is configured to provide, assigning a quantity of points to a particular vulnerability, rather than only a fee. For example, metadata representing a vulnerability as seen in FIG. 4A also may include a minimum points value and a maximum points value, and the process of FIG. 4B also may include determining a particular points value for a particular vulnerability by mapping the vulnerability score within a range of points defined by the minimum points value and maximum points value. Determining the particular points value may use a linear mapping or a non-linear, weighted and/or scaled mapping in various embodiments. In one embodiment, the mapping may use a blended mapping function that blends values for vulnerability score, a submission quality score that represents the quality of a vulnerability report or submission, a perceived value of the asset in the network under test 208, and/or other values.

Further, FIG. 1, FIG. 3, and/or control logic 224 may be configured to create, store and/or cause displaying a leaderboard that identifies the researcher computers 202 and the total points or particular points values that the researchers have earned or obtained. Researcher computers 202 may be identified using pseudonyms, screen names or handles.

FIG. 1, FIG. 3, and/or control logic 224 may be configured to determine one or more prizes that are awarded to the researcher computer 202 or researcher who achieves the highest number of points within a particular award period such as within a particular month.

FIG. 1, FIG. 3, and/or control logic 224 may be configured to create, store and/or cause displaying data representing accomplishment levels for particular researcher computers 202 based upon total points that are earned by or awarded to the researchers. For example, a particular achievement may be associated with identifying a particular number of vulnerabilities, earning a particular number of points, or earning fees at a particular total amount. Each achievement may be associated with a graphical icon such as a badge, or may be associated with a prize, fee, virtual currency, admission to an event, or other award or recognition for the researcher or researcher computer 202.

FIG. 1, FIG. 3, and/or control logic 224 may be configured to facilitate redemption of points for things that are consistent with the white-hat role of the researcher computers 202. For example, FIG. 1, FIG. 3, and/or control logic 224 may be configured to facilitate redeeming points awarded in any of the foregoing embodiments for travel, gifts, dining, or other things. FIG. 1, FIG. 3, and/or control logic 224 may be configured to perform transfer of points earned using the methods or system to external systems, including loyalty points systems, using electronic interfaces to those systems and according to specified transfer ratios that transform points earned for finding computer vulnerabilities into airline points, hotel points, dining points, or other kinds of points of third-party systems.

5. Implementation Example

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
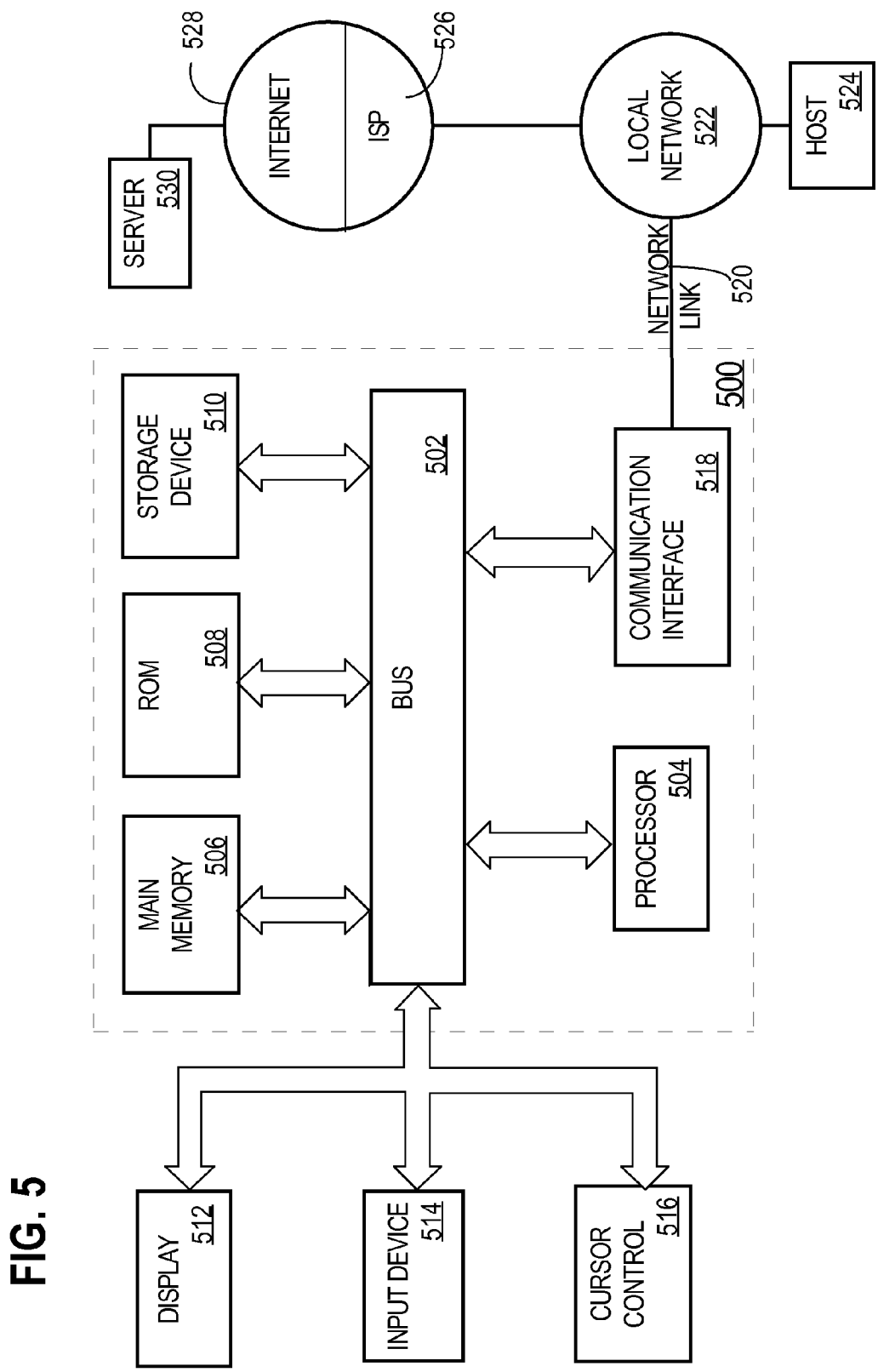
FIG. 5 illustrates a computer system with which an embodiment may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

6. Extensions and Alternatives

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A data processing method comprising:
using a computer, inviting a distributed plurality of researcher computers to participate in one or more computer vulnerability research projects directed to identifying computer vulnerabilities of one or more networks and/or computers that are owned or operated by a third party;
using the computer, assigning a particular computer vulnerability research project, relating to a particular network under test, to a particular researcher computer from among a subset of the researcher computers;
using control logic that is logically interposed between the particular researcher computer and the particular network under test, monitoring networked data communications between the particular researcher computer and the particular network under test, wherein the communications relate to attempting to identify a candidate security vulnerability of the particular network under test;
validating a report of the candidate security vulnerability of the particular network under test that is received from the particular researcher computer;
wherein the validating comprises attempting duplication of the candidate security vulnerability after receiving the report;
performing one or more remediation operations on the particular network under test based at least in part upon the report;
wherein the method is performed using one or more computing devices.

2. The method of claim 1 comprising updating, based upon the report, an automated scanning system that is communicatively coupled to the control logic and to the particular network under test.

3. The method of claim 1 comprising, using the computer, assessing one or more of reputation and skills of one or more researchers who are associated with the researcher computers, and accepting as the subset only those the researchers who have a positive reputation and sufficient skills to perform the investigations of the computer vulnerabilities.

4. The method of claim 1 comprising determining and providing an award to the particular researcher computer in response to successfully validating the report of the candidate security vulnerability of the particular network under test that is received from the particular researcher computer.

5. The method of claim 4 comprising:
determining a vulnerability score for the candidate security vulnerability of the particular network under test that is received from the particular researcher computer, wherein the vulnerability score indicates a relative importance of the candidate security vulnerability;
based upon the vulnerability score, determining and providing the award.

6. The method of claim 4 comprising:
determining a vulnerability score for the candidate security vulnerability of the particular network under test that is received from the particular researcher computer, wherein the vulnerability score indicates a relative importance of the candidate security vulnerability;
mapping the vulnerability score to a particular award that is within a range of a minimum award value and a maximum award value that are stored in a record identifying the candidate security vulnerability in a database;
based upon the mapping, determining and providing the particular award.

7. The method of claim 6 comprising:
determining and providing a plurality of awards of different amounts of points to the particular researcher computer in response to validating a plurality of different reports of different candidate security vulnerabilities that are received from the same particular researcher computer at different times within a period;
determining and providing an additional award to the same particular researcher when a sum of the different amounts of points awarded within the period is greater than a specified threshold.

8. The method of claim 1 comprising:
assigning two different particular computer vulnerability research projects, relating to two different particular networks under test, to two different geographically distant particular researcher computers from among the subset of the researcher computers;
using a computer that is logically interposed between the two different particular researcher computers and the particular network under test, monitoring communications between the two different particular researcher computers and the two different particular networks under test, wherein the communications relate to attempting to identify two different candidate security vulnerabilities of the two different particular networks under test;
validating two different reports of the two different candidate security vulnerability of the two different particular networks under test that are received respectively from the two different particular researcher computers;

determining and providing two different awards to the two different particular researcher computers in response to successfully validating the reports.

9. The method of claim 1 comprising:
validating the particular security vulnerability by re-performing, on a target computer of the particular network under test, one or more operations that are identified in the report;
providing a validated report of the security vulnerability to an administrator computer that is associated with the particular network under test.

10. The method of claim 1 comprising:
assigning one particular computer vulnerability research project, relating to a particular network under test, to two different particular researcher computers from among the subset of the researcher computers;
using the control logic, monitoring communications between the two different particular researcher computers and the particular network under test, wherein the communications relate to attempting to identify a candidate security vulnerability of the particular network under test;
receiving two different reports of the same candidate security vulnerability of the particular network under test from the two different particular researcher computers respectively;
validating a first report of the candidate security vulnerability of the particular network under test that is received from a first particular researcher computer;
determining that a second report, received from a second particular researcher computer, of the candidate security vulnerability is a duplicate report;
determining and providing the award only to the first particular researcher computer in response to successfully validating the first report.

11. The method of claim 1 comprising receiving, from an automated scanning system that is communicatively coupled to the control logic and to the particular network under test, one or more scanning reports based upon performing scanning operations on the particular network under test, and using the one or more scanning reports to provide baseline vulnerability data for the one or more computer vulnerability research projects.

12. A computer system comprising:
a first computer that is communicatively coupled to a plurality of networks under test, an automated scanning system and a vulnerability database, and that is logically interposed in a network topology between the plurality of networks under test and a distributed plurality of researcher computers;
one or more non-transitory computer-readable storage media in the first computer storing one or more sequences of instructions which when executed cause performing:
using the first computer, inviting the distributed plurality of researcher computers to participate in one or more computer vulnerability research projects directed to identifying computer vulnerabilities of one or more networks and/or computers that are owned or operated by a third party;
assigning a particular computer vulnerability research project, relating to a particular network under test, to a particular researcher computer from among a subset of the researcher computers;
using a second computer, monitoring networked data communications between the particular researcher computer and the particular network under test, wherein the communications relate to attempting to identify a candidate security vulnerability of the particular network under test;
validating a report of the candidate security vulnerability of the particular network under test that is received from the particular researcher computer;
wherein the validating comprises attempting duplication of the candidate security vulnerability after receiving the report;
performing one or more remediation operations on the particular network under test based at least in part upon the report.

13. The computer system of claim 12, the storage media comprising sequences of instructions which when executed cause updating, based upon the report, an automated scanning system that is communicatively coupled to the control logic and to the particular network under test.

14. The computer system of claim 12, the storage media comprising sequences of instructions which when executed cause, using the first computer, assessing one or more of reputation and skills of one or more researchers who are associated with the researcher computers, and accepting as the subset only those the researchers who have a positive reputation and sufficient skills to perform the investigations of the computer vulnerabilities.

15. The computer system of claim 12, the storage media comprising sequences of instructions which when executed cause determining and providing an award to the particular researcher computer in response to successfully validating the report of the candidate security vulnerability of the particular network under test that is received from the particular researcher computer.

16. The computer system of claim 15, the storage media comprising sequences of instructions which when executed cause:
determining a vulnerability score for the candidate security vulnerability of the particular network under test that is received from the particular researcher computer, wherein the vulnerability score indicates a relative importance of the candidate security vulnerability;
based upon the vulnerability score, determining and providing the award.

17. The computer system of claim 15, the storage media comprising sequences of instructions which when executed cause:
determining a vulnerability score for the candidate security vulnerability of the particular network under test that is received from the particular researcher computer, wherein the vulnerability score indicates a relative importance of the candidate security vulnerability;
mapping the vulnerability score to a particular award that is within a range of a minimum award value and a maximum award value that are stored in a record identifying the candidate security vulnerability in a database;
based upon the mapping, determining and providing the particular award.

18. The computer system of claim 17, the storage media comprising sequences of instructions which when executed cause:
determining and providing a plurality of awards of different amounts of points to the particular researcher computer in response to validating a plurality of different reports of different candidate security vulnerabilities that are received from the same particular researcher computer at different times within a period;

determining and providing an additional award to the same particular researcher when a sum of the different amounts of points awarded within the period is greater than a specified threshold.

19. The computer system of claim 12, the storage media comprising sequences of instructions which when executed cause:
- assigning two different particular computer vulnerability research projects, relating to two different particular networks under test, to two different geographically distant particular researcher computers from among the subset of the researcher computers;
- using a computer that is logically interposed between the two different particular researcher computers and the particular network under test, monitoring communications between the two different particular researcher computers and the two different particular networks under test, wherein the communications relate to attempting to identify two different candidate security vulnerabilities of the two different particular networks under test;
- validating two different reports of the two different candidate security vulnerability of the two different particular networks under test that are received respectively from the two different particular researcher computers;
- determining and providing two different awards to the two different particular researcher computers in response to successfully validating the reports.

20. The computer system of claim 12, the storage media comprising sequences of instructions which when executed cause:
- validating the particular security vulnerability by re-performing, on a target computer of the particular network under test, one or more operations that are identified in the report;
- providing a validated report of the security vulnerability to an administrator computer that is associated with the particular network under test.

21. The computer system of claim 12, the storage media comprising sequences of instructions which when executed cause:
- assigning one particular computer vulnerability research project, relating to a particular network under test, to two different particular researcher computers from among the subset of the researcher computers;
- using the control logic, monitoring communications between the two different particular researcher computers and the particular network under test, wherein the communications relate to attempting to identify a candidate security vulnerability of the particular network under test;
- receiving two different reports of the same candidate security vulnerability of the particular network under test from the two different particular researcher computers respectively;
- validating a first report of the candidate security vulnerability of the particular network under test that is received from a first particular researcher computer;
- determining that a second report, received from a second particular researcher computer, of the candidate security vulnerability is a duplicate report;
- determining and providing the award only to the first particular researcher computer in response to successfully validating the first report.

22. The computer system of claim 12, the storage media comprising sequences of instructions which when executed cause: receiving, from an automated scanning system that is communicatively coupled to the first computer and to the particular network under test, one or more scanning reports based upon performing scanning operations on the particular network under test, and using the one or more scanning reports to provide baseline vulnerability data for the one or more computer vulnerability research projects.

* * * * *